United States Patent [19]

Gorter et al.

[11] 3,969,769
[45] July 13, 1976

[54] MAGNETO-RESISTIVE HEAD

[75] Inventors: Frederik Willem Gorter; Jan Antoon Ludolf Potgiesser, both of Eindhoven, Netherlands

[73] Assignee: U.S. Philips Corporation, New York, N.Y.

[22] Filed: Apr. 17, 1975

[21] Appl. No.: 568,994

[30] Foreign Application Priority Data
Apr. 29, 1974  Netherlands............................ 05727

[52] U.S. Cl. ................................................ 360/113
[51] Int. Cl.² ............................................. G11B 5/12
[58] Field of Search............ 360/113; 338/32 R, 324; 324/46

[56] References Cited
UNITED STATES PATENTS 3,814,863  6/1974  O'Day et al......................... 360/113
3,848,217  11/1974  Lazzari ............................... 360/113
3,860,965  1/1975  Voegeli ............................... 360/113
3,879,760  4/1975  Lazzari ............................... 360/113

*Primary Examiner*—Alfred H. Eddleman
*Attorney, Agent, or Firm*—Frank R. Trifari

[57] ABSTRACT

A magnetic head utilizing the magneto-resistive effect with at least two magneto-resistive elements present in one plane at right angles to the recording medium. The elements are connected to an output circuit in which their signals are subtracted from each other. In this manner compensation is provided for both interference signals and crosstalk signals. The head may comprise a reading element and a compensation element arranged above it or a reading element flanked by two compensation elements with a larger distance to the recording medium or with a smaller height.

5 Claims, 5 Drawing Figures

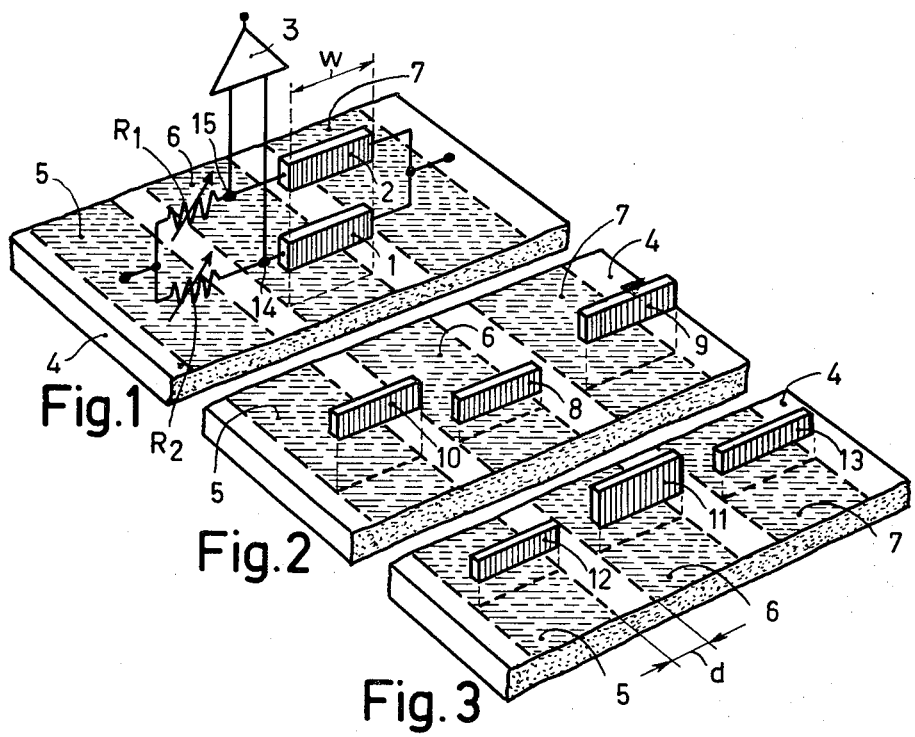
Fig.1
Fig.2
Fig.3
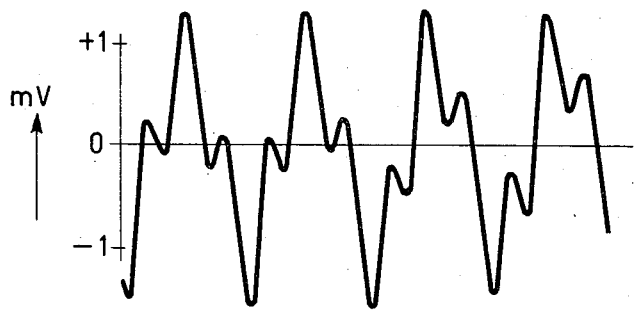
Fig. 4
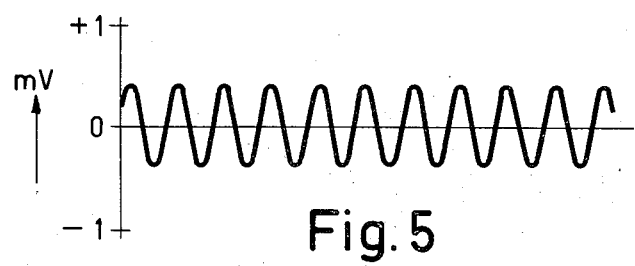
Fig. 5

MAGNETO-RESISTIVE HEAD

The invention relates to a magnetic head operating via the magneto-resistive effect for detecting information-representing magnetic fields on a magnetic recording medium.

Such a magnetic head is known, for example, from the U.S. Pat. No. 3,493,694.

The operation of said so-called magneto-resistive head is based on the use of a strip-shaped element of a ferromagnetic, metallic material of low coercive force, for example NiFe, which is arranged in the immediate proximity of, or in contact with, a magnetic recording medium. The field of the recording medium produces variations in the magnetization of the element and modulates the resistance thereof via the magneto-resistive effect. This means that when the recording medium passes the head, the information-representing magnetic fields which are present on the recording medium rotate the spin system of the magneto-resistive element so that the resistaance varies. In this manner the output signal of an external circuit which is connected to the element assumes the form of voltage or current fluctuations which represent the information stored in the recording medium.

It is known that a magneto-resistive head can have a larger output signal than a conventional inductive magnetic head, while a head having a very small track width can be realized by providing the magneto-resistive element by means of integration techniques. As a result of this a higher information density could be achieved. However, when it is endeavoured to use said properties which are present in principle, problems present themselves which cannot be solved as such.

A first problem is that, when the track width is chosen to be very small, the information of adjacent tracks is also read with that of a selected track. This disturbance, termed cross-talk, forces the designer of recording systems to leave a comparatively wide unwritten space between adjacent tracks. As a result of this the maximum information density is not reached. When the track width is reduced, a relatively increasing part of the information-carrying material is left unused.

A second problem is that (static) interference fields beside the information signal also cause an output signal, as time-dependent interference fields do this in an inductive magnetic head.

It is the object of the present invention to provide a magnetic head which operates via the magneto-resistive effect and in which the above-mentioned problems are solved. For that purpose the magnetic head according to the invention is characterized in that it comprises at least two elongate detection elements of a magneto-resistive material which are provided on a substrate, the longitudinal axis of at least one element being parallel to the recording medium, the elements having connection points for connection to an electric circuit in which their signals are subtracted from each other.

The invention is based on the recognition of the fact that the wavelength characteristic of a magneto-resistive element is considerably influenced by the distance between the element and the information-carrying medium and also that the output signal decreases by an exponential function of the wavelength when the distance is increased.

Since magneto-resistive elements can be provided very close together by means of integration techniques, it is possible with the use of, for example, two of said elements, to compensate for interference signals having gradients which are none too large by subtracting their signals from each other. In particular it is very simple to vapour-deposit or sputter the required elements in one plane on the same substrate.

A preferred embodiment of the magnetic head according to the invention is characterized in that it comprises two elements to be placed, during operation, above the same track of a recording medium, the distance from the farthest remote element to the recording medium being of the order of magnitude of the distance between two adjacent tracks on the recording medium. Herewith it is ensured that the signal of the selected track detected by said element is strongly reduced so that after subtraction of the output signals of the two elements mainly the -undisturbed- information signal remains.

According to further preferred embodiments of the magnetic head according to the invention the crosstalk compensation can be optimized in that it comprises a first element for detecting information on a selected track of the recording medium and at least one further element to be placed above an adjacent track for compensating for crosstalk of the adjacent track, the height of the further element being smaller and/or the distance to the recording medium being larger than that of the first element.

Yet another preferred embodiment of the magnetic head according to the invention is characterized in that it comprises a first element for detecting information on a selected track on the recording medium and at least one further element present at a larger distance from the recording medium and at an angle therewith for compensating for crosstalk of at least one adjacent track.

The invention will be described in greater detail by way of example with reference to the drawing. In the drawing FIGS. 1, 2 and 3 show various configurations of magneto-resistive elements;

FIG. 4 shows a signal read by means of a single magneto-resistive element and;

FIG. 5 shows a signal read by means of the configuration shown in FIG. 1.

FIG. 1 shows diagrammatically a configuration of two detection elements 1 and 2 of magneto-resistive material. The elements 1 and 2 which are preferably provided on the same substrate (not shown) are connected to a direct voltage source not shown. As a result of this, currents which can be adjusted by means of the resistors R1 and R2 flow through the elements 1 and 2. Herewith differences in the voltages across the elements with an external magnetic field zero, which may be caused, for example, by differences in the geometry, can be compensated for. The elements 1 and 2 are incorporated in a bridge circuit. An output signal is derived between the points 14 and 15 and is supplied to a difference amplifier 3. Another possibility is to separate direct voltage and signal voltages from each other by means of filters and to supply the signal voltages to a difference amplifier. The detection elements 1 and 2 co-operate with a recording medium 4 which comprises information tracks 5, 6, 7 having a width $w$ with guard bands having a width $d$ between them.

The cross-talk of track 5 and track 7, respectively, to the element 1 can be compensated for by means of the element 2, since in this case it deals with the longer wavelength which crosstalk substantially to the same extent to element 1 as to element 2. By choosing other configurations, a strong reduction of the crosstalk can be achieved in all circumstances.

FIG. 2, for example, shows an element 8 which is flanked on either side by compensation elements 9 and 10 which are present above the two adjacent tracks 5 and 7. In this case the compensation elements 9 and 10 are present at a larger distance from the recording medium 4 than the element 8. FIG. 3 shows an element 11 which is flanked by compensation elements 12 and 13 which have a smaller height than the element 11. With suitable choice of the distance of the respective elements to the recording medium 4, or of their height, the configurations shown present the advantage that it is not necessary to supply the signals of the compensation elements to the amplifier with a given weight function.

FIG. 4 shows the output signal of a single magneto-resistive element (the element 1 of FIG. 1) upon reading a signal having a frequency of 250 Hz on the recording medium 4, while an interference signal having a frequency of 85 Hz was present.

FIG. 3 shows the signal which is obtained by subtracting the output signal of element 2 electronically from the output signal of element 1. In this case, element 1 was in contact with the recording medium and element 2 was at a distance of 100 μm therefrom. The compensation of the interference signal in this case was 25 dB.

What is claimed is:

1. A magnetic head for detecting information-representing magnetic fields on an associated magnetic recording medium having a plurality of generally parallel data tracks disposed thereon which comprises:

at least first and second elongate magneto-resistive detection elements, each of said elements being oriented so that any magnetically recorded data in the tracks which causes one element to increase resistance also causes the other to increase resistance and any magnetically recorded data which causes one element to decrease the resistance thereof causes the other also to decrease the resistance thereof, one of said elements being disposed with the longitudinal axis thereof generally perpendicular to the data tracks, each of said elements being disposed with the longitudinal axis thereof parallel to the recording medium and in spaced relationship from each other element to prevent magneto static coupling therebetween;

means for generating an electric potential;

means for connecting said electric potential to each of said elements to generate a signal with each of said elements; and means for generating an additional signal which is a function of the difference between at least two of said signals.

2. A magnetic head as claimed in claim 1, wherein said first and second elements are disposed above the same track of the associated recording medium at different distances, the distance from the more remote element to the recording medium being of the order of magnitude of the distance between two adjacent tracks on the recording medium.

3. A magnetic head as claimed in claim 1 wherein said first element is disposed over a first track and said second element is disposed over a second track, said second track being adjacent to said first track, the height of said second element being smaller than said first element.

4. A magnetic head as claimed in claim 1 wherein said first element is disposed over a first track and said second element is disposed over a second track, said first track being adjacent to said first track, the distance between said second element and said recording element being larger than the distance between said first element and said recording medium.

5. A magnetic head as claimed in claim 1 wherein said first element is disposed over a first track and a second element is disposed at a greater distance from the recording medium than said first element, said second element having the longitudinal axis thereof disposed at an oblique angle with respect to said first element to compensate for crosstalk of at least one adjacent track.

* * * * *

UNITED STATES PATENT AND TRADEMARK OFFICE
CERTIFICATE OF CORRECTION

PATENT NO. : 3969769
DATED : July 13, 1976
INVENTOR(S) : FREDERIK WILLEM GORTER ET AL It is certified that error appears in the above-identified patent and that said Letters Patent are hereby corrected as shown below:

Title Page, Section 30

"05727" should be --7405727--

Signed and Sealed this

Eighteenth Day of January 1977

[SEAL]

Attest:

RUTH C. MASON
*Attesting Officer*

C. MARSHALL DANN
*Commissioner of Patents and Trademarks*